US009049300B1

(12) United States Patent
Anders et al.

(10) Patent No.: US 9,049,300 B1
(45) Date of Patent: Jun. 2, 2015

(54) TELEPHONIC PRIVACY SYSTEMS

(71) Applicant: ITELLAS COMMUNICATIONS, LLC, Birmingham, AL (US)

(72) Inventors: William Corey Anders, Vestavia, AL (US); Joel Lamar Lansden, Birmingham, AL (US)

(73) Assignee: ITELLAS, LLC, Birmingham, AL (US)

( * ) Notice: Subject to any disclaimer, the term of this patent is extended or adjusted under 35 U.S.C. 154(b) by 0 days.

(21) Appl. No.: 14/209,788

(22) Filed: Mar. 13, 2014

Related U.S. Application Data

(60) Provisional application No. 61/784,287, filed on Mar. 14, 2013.

(51) Int. Cl.
*H04M 1/56* (2006.01)
*H04M 15/06* (2006.01)
*H04M 3/42* (2006.01)
*H04M 1/57* (2006.01)

(52) U.S. Cl.
CPC ..................................... *H04M 1/571* (2013.01)

(58) Field of Classification Search
CPC ... H04M 1/57; H04M 1/571; H04M 3/42008; H04M 3/436
USPC ............. 379/142.02, 142.05, 201.11, 207.13, 379/207.14, 210.02, 210.03
See application file for complete search history.

(56) References Cited

U.S. PATENT DOCUMENTS

| | | | |
|---|---|---|---|
| 5,274,699 A | 12/1993 | Ranz | |
| 5,278,894 A | 1/1994 | Shaw | |
| 5,283,824 A | 2/1994 | Shaw | |
| 5,590,184 A | 12/1996 | London | |
| 5,784,444 A | 7/1998 | Snyder et al. | |
| 5,832,072 A | 11/1998 | Rozenblit | |
| 5,864,612 A | 1/1999 | Strauss et al. | |
| 6,125,175 A | 9/2000 | Goldberg et al. | |
| 6,229,878 B1 | 5/2001 | Moganti | |
| 6,266,399 B1 | 7/2001 | Weller et al. | |
| 6,377,664 B2 | 4/2002 | Gerszberg et al. | |
| 6,404,872 B1 * | 6/2002 | Goldberg et al. | 379/201.11 |
| 6,459,776 B1 | 10/2002 | Aktas et al. | |
| 6,567,671 B2 | 5/2003 | Amin | |
| 6,631,181 B1 | 10/2003 | Bates et al. | |
| 6,662,006 B2 | 12/2003 | Glass | |
| 6,683,938 B1 | 1/2004 | Henderson | |
| 6,700,969 B1 * | 3/2004 | Shaffer et al. | 379/211.01 |
| 6,804,334 B1 | 10/2004 | Beasley et al. | |
| 6,975,707 B2 | 12/2005 | Memos | |
| 7,020,259 B2 | 3/2006 | Hussain et al. | |
| 7,043,232 B2 | 5/2006 | Pelaez et al. | |
| 7,072,452 B1 | 7/2006 | Roberts et al. | |
| 7,177,631 B2 | 2/2007 | Amin | |
| 7,236,577 B2 | 6/2007 | Lection et al. | |
| 7,424,099 B2 | 9/2008 | Roberts et al. | |
| 7,551,731 B2 | 6/2009 | Durga et al. | |
| 7,627,094 B2 | 12/2009 | Kraft et al. | |
| 7,860,230 B2 | 12/2010 | Martin | |
| 7,995,727 B1 | 8/2011 | Chmara et al. | |
| 8,000,685 B2 | 8/2011 | Benco et al. | |
| 8,027,442 B2 * | 9/2011 | Crandell et al. | 379/142.06 |
| 8,050,389 B2 | 11/2011 | Hernandez et al. | |
| 8,077,833 B2 | 12/2011 | Ray | |
| 8,081,741 B2 | 12/2011 | Roberts et al. | |
| 8,135,119 B1 | 3/2012 | Zhao et al. | |
| 8,145,196 B2 | 3/2012 | Wood et al. | |
| 8,160,226 B2 | 4/2012 | Wood et al. | |
| 8,213,587 B2 | 7/2012 | Vendrow | |
| 8,229,078 B2 | 7/2012 | Wright et al. | |
| 8,243,909 B2 | 8/2012 | Wood et al. | |
| 8,265,239 B2 | 9/2012 | Narayan et al. | |
| 8,265,603 B2 | 9/2012 | Wood et al. | |
| 8,306,202 B2 * | 11/2012 | Citron et al. | 379/142.07 |
| 8,325,899 B2 | 12/2012 | Martin | |
| 8,422,656 B2 | 4/2013 | Pearson et al. | |
| 8,494,506 B2 | 7/2013 | Kuhl et al. | |
| 8,774,379 B1 | 7/2014 | Youngs et al. | |
| 2002/0080942 A1 | 6/2002 | Clapper | |
| 2002/0181681 A1 | 12/2002 | Mani | |
| 2003/0031303 A1 | 2/2003 | Lee et al. | |
| 2003/0147519 A1 | 8/2003 | Jain et al. | |
| 2004/0125965 A1 | 7/2004 | Alberth, Jr. et al. | |
| 2004/0218743 A1 * | 11/2004 | Hussain et al. | 379/201.11 |
| 2005/0135594 A1 | 6/2005 | Caspi | |
| 2005/0201533 A1 | 9/2005 | Emam et al. | |
| 2006/0008060 A1 | 1/2006 | Memos | |
| 2006/0026277 A1 * | 2/2006 | Sutcliffe | 709/224 |
| 2006/0140200 A1 | 6/2006 | Black et al. | |

(Continued)

FOREIGN PATENT DOCUMENTS

WO  WO2004057849   7/2007
WO  WO2013149301   10/2013

OTHER PUBLICATIONS

Itellas Communications "U.S. Appl. No. 14/213,853 Telephonic Privacy Systems"; filed Mar. 14, 2014.

*Primary Examiner* — Quoc D Tran

(74) *Attorney, Agent, or Firm* — Paul Sykes; Nicholas J. Landau; Bradley Arant Boult Cummings LLP

(57) ABSTRACT

Methods for protecting telephone privacy are provided that utilize the phone number of the other party to a telephone call to automatically determine whether privacy protection is necessary and to automatically take measures to protect the user's privacy. Particular versions, such as an app for a smart phone that performs the methods, are also provided.

27 Claims, No Drawings

(56) References Cited

U.S. PATENT DOCUMENTS

| | | |
|---|---|---|
| 2006/0239419 A1 | 10/2006 | Joseph et al. |
| 2007/0036297 A1 | 2/2007 | Miranda-Knapp et al. |
| 2007/0121871 A1* | 5/2007 | Mullis et al. ............. 379/201.11 |
| 2007/0258567 A1 | 11/2007 | Koch |
| 2007/0263819 A1 | 11/2007 | Finkelman et al. |
| 2008/0008105 A1 | 1/2008 | Black et al. |
| 2008/0045186 A1 | 2/2008 | Black et al. |
| 2008/0056455 A1 | 3/2008 | Yang et al. |
| 2008/0084975 A1 | 4/2008 | Schwartz |
| 2008/0123834 A1 | 5/2008 | Brown et al. |
| 2008/0159501 A1 | 7/2008 | Cai |
| 2009/0059897 A1 | 3/2009 | Anantharaman et al. |
| 2009/0086947 A1 | 4/2009 | Vendrow |
| 2009/0168986 A1 | 7/2009 | Jacksons et al. |
| 2011/0090823 A1 | 4/2011 | Silver |
| 2011/0110518 A1 | 5/2011 | Cohen et al. |
| 2011/0159855 A1 | 6/2011 | Cheng |
| 2011/0250870 A1 | 10/2011 | Silva |
| 2012/0015634 A1 | 1/2012 | Silva |
| 2012/0129501 A1 | 5/2012 | Silva |
| 2012/0163569 A1 | 6/2012 | Canu et al. |
| 2012/0172004 A1 | 7/2012 | Silva |
| 2012/0189111 A1 | 7/2012 | Siminoff |
| 2012/0219128 A1* | 8/2012 | Farah et al. ................ 379/88.19 |
| 2012/0288069 A1 | 11/2012 | Naparstek |
| 2012/0289205 A1 | 11/2012 | Burgess |
| 2013/0157716 A1 | 6/2013 | Khan |
| 2013/0188788 A1* | 7/2013 | Pearson et al. ........... 379/201.01 |
| 2013/0189942 A1 | 7/2013 | Vendrow et al. |
| 2013/0316677 A1 | 11/2013 | Aharon |
| 2014/0079201 A1 | 3/2014 | Bennett |

* cited by examiner

TELEPHONIC PRIVACY SYSTEMS

CROSS-REFERENCE TO RELATED APPLICATIONS

This application cites the benefit of the filing date under 35 U.S.C. §119(e) of provisional U.S. Application No. 61/784,287, filed Mar. 14, 2013.

BACKGROUND

1. Field of the Disclosure

The present disclosure relates generally to telecommunications, more specifically to caller-identification facilitated approaches the preserving the privacy of a party to a telephonic communication.

2. Background

The telecommunications revolution has facilitated effortless voice and data communication globally, but at a cost to personal privacy. Many telephonic systems are available that did not exist a generation ago, such as smart phones, cellular networks, and voice-over-internet (all of which are referred to as "telephones" in this disclosure). However, technologies have also advanced for obtaining information about the participants of telephone conversations without their consent.

A caller's phone number and the location at which the number is registered can be revealed using caller identification ("caller ID"). Coupling caller ID with reverse-lookup databases can reveal the caller's name and address, which in turn can be used to discover more personal information about the caller. When calling from a non-mobile telephone, the caller ID information can be used to pinpoint the caller's geographic location. Caller ID is a boon to those who wish to know whether they can trust the originator of a call, but it is a bane to those who wish to use their telephones without surrendering private information to everyone they call.

Telephones are vulnerable to other forms of invasive data collection as well. Voice recognition and analysis systems can be used to identify a party to a phone conversation and to gather biometric information about the party without that party's knowledge or consent. Background sounds can be analyzed to establish the personal location of the party. Furthermore, the popularity of mobile telephones gives unwanted callers the ability to intrude on anyone carrying a telephone wherever they may be.

Although many telephones have caller ID capabilities, during the brief ring period it is difficult to assess whether the number that appears on the telephone belongs to a party with whom the telephone owner wishes to speak, or whether it belongs to an unknown or hostile party. Should a hostile or untrusted party ("unpopular party") succeed in connecting, that party can use any of the methods detailed above to attempt to obtain non-public information about the telephone owner.

Most telephone service providers offer their subscribers the ability to block certain calls. When someone tries to dial in from a blocked number, a message is received that they have been blocked. Although this achieves the goal of preventing a call from being connected from an unpopular party, it is not a viable option if one wishes to communicate in some limited way with the unpopular party, but with some level of privacy protection in place. For example, a person fleeing from a domestic abuse situation may wish to avoid receiving a call from the abuser without alerting the abuser to the fact that he has been blocked. Therefore a need exists for a way to rapidly identify an unpopular party to a telephone conversation and automatically modify the call to activate a privacy security measure.

SUMMARY

Methods and devices are disclosed that automatically determine if a party to a telephone conversation (either the caller or the recipient) is a party against whom security measures are desired (referred to in this disclosure as an "unpopular party") and enact such a security measure if necessary. These methods and devices rely on caller ID data to identify an unpopular caller; and on the number dialed to identify an unpopular recipient. The unpopular party may be identified in one of two general ways: the unpopular party's number is on a blacklist, or the unpopular party's number is not on a white list.

Generally, a method of modifying a telephone call between a local telephone and a remote telephone is provided, the method comprising identifying the number of the remote telephone; comparing a portion of the number of the remote telephone to a stored list comprising a plurality of designated numbers; and applying a call rule selected from one of the following: activating a call modification protocol if the portion of the number of the remote caller is one of the designated numbers; or activating a call modification protocol if the portion of the number of the remote caller is not one of the designated numbers. A computing device is also provided that is configured or programmed to perform the above method. In some embodiments the computing device is a component of a smart phone. A memory storage device is also provided comprising a stored program containing a set of instructions which when read by a general purpose computing device causes the device to perform any of the above methods.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. Definitions

With reference to the use of the word(s) "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and/or the following claims.

The term "telephone" or "phone" in this disclosure refers to any device for two-way network-mediated audio communication. This includes, but is not limited to, traditional telephones wired into a circuit-switched network, mobile telephones connected to a cellular network, and telephones that communicate over the Internet via the voice-over internet protocol (VoIP).

The term "about" as used herein refers to a value that may vary within the range of expected error inherent in typical measurement techniques known in the art.

The term "storage device" as used herein refers to a machine-readable data storage device that retains data that can be read by mechanical, optical, or electronic means, for example by a processor. Such devices are sometimes referred to as "memory," although as used herein a machine-readable data storage device cannot comprise a human mind in whole or in part, including human memory. A storage device may be classified as primary, secondary, tertiary, or off-line storage. A storage device cannot be construed to be a mere signal, although information may be communicated to and from a storage device via a signal.

The term "processor" or "central processing unit" (CPU) as used herein, refers to a software execution device capable of executing a sequence of instructions ("program"). The CPU comprises an arithmetic logic unit, and may further comprise one or both of a register and cache memory.

The term "microprocessor" refers to a CPU on at least one integrated circuit. Modern microprocessors often comprise one integrated circuit.

The term "computing device" refers to a CPU, a memory storage device, and a bus connected to exchange information between the CPU and the memory storage device. The CPU may comprise one or both of a register and a cache. Additional peripherals may be present.

B. Call Modification Methods

The methods disclosed herein relate to telephonic communications between two parties, who will be referred to as the "local telephone" and the "remote telephone." These designations of course have nothing to do with the extent of the geographic distance between them. The local telephone refers to the telephone of the party who desires to maintain his or her privacy, and the remote telephone refers to the telephone on the other end of the call, which may or may not be associated with an unpopular party.

As stated above, a general embodiment of the method comprises identifying the number of the remote telephone; comparing a portion of the number of the remote telephone to a stored list comprising a plurality of designated numbers; and applying a call rule selected from one of the following: (i) activating a call modification protocol if the portion of the number of the remote caller is one of the designated numbers; or (ii) activating a call modification protocol if the portion of the number of the remote caller is not one of the designated numbers.

In embodiments of the method in which the local phone initiates the call, the method may also include sending "spoofed" caller ID information to the remote phone. By transmitting caller ID information that is not restricted to the number of the local phone, numerous advantages can be realized, related to the desire to maintain privacy and other goals. Caller ID spoofing is useful in maintaining a caller privacy in that it prevents the recipient of the call from obtaining information relating to the identity or location of the caller. It also prevents information that could be personally identifying from being obtained without authorization. Apart from privacy concerns, it is sometimes desirable to communicate the user's identity to the remote telephone using a number other than that of the local phone. For example, a patent examiner might wish to contact a patent attorney by telephone when the examiner is telecommuting. Mindful that patent attorneys often screen their calls, and mindful that patent attorneys are eager to answer calls from the Patent Office, the examiner may wish to transmit his office number from his mobile phone, so that the patent attorney will realize an official communication is being attempted. Sending spoofed caller ID information can also allow a caller to use automated telephone systems that use caller ID for authentication when the caller is away from her home phone. Yet another example is a physician who is on call in a medical practice who must call a patient after hours. The patient might not recognize the on-call physician's cellular telephone number (especially if the physician on-call is not the patient's primary care physician), so the physician may instead send the main office number as the caller ID information.

The number of the remote telephone may be ascertained by any known method. This may include methods such as using the caller ID information of the remote phone if the remote phone was the caller. If the local phone initiated the call, the number of the remote telephone may also be ascertained by reading the number that was dialed on the local phone. Specific embodiments may be limited to either or both of those two known methods, or may be limited to exclude either or both of those two known methods.

Once the number has been obtained, it is compared to a stored list comprising a plurality of designated numbers. In some versions of the method this list is a "blacklist" of numbers associated with unpopular parties. In other versions of the method the list is a "white list" of numbers that are known not to be associated with unpopular parties. Blacklisted numbers may be associated with any party against whom the user wishes to insure his or her privacy. Examples may include debt collectors, adverse litigants, solicitors, etc. A blacklisted number need not be associated with an antisocial or criminal party; as another example, a blacklisted number may be associated with a professional colleague if the user wishes to insulate his or her personal life from professional peers. A white list, on the other hand, is a list of numbers associated with parties who are not unpopular parties. This will often mean the user feels no need to protect his or her privacy from the person with the white listed number. The list need not be a blacklist or a white list. In several embodiments described below the list comprises numbers that trigger differing call modifications depending on the identity of the caller.

The "list" is a machine-readable file stored on a memory storage device. The storage device may be, for example, the memory of a smart phone. It may be the memory of a personal computer, particularly in VoIP applications in which the personal computer serves as part of the phone. The storage device may be part of a call handling system, in which subscribers' calls are routed through the system; in such embodiments of the method the call handling system may perform the steps of the method. The steps of the method may be performed by any computing device that has access to the remote telephone's number. Examples include a computing device that is a component of the local phone and a computing device that provides VoIP services.

The numbers on the stored list may be entire phone numbers or partial phone numbers (or both may be on the list). Partial numbers may be country prefixes, area codes, exchanges, or the final four digits of a number. Thus the method may comprise comparing the portion of the number of the remote telephone to an entire phone number on the list or a portion of a phone number on the list. Using combinations of these methods, the call rules may be applied to entire area codes, country prefixes, exchanges, etc.

One of two types of general call rules may be applied once the remote number has been compared to the list of designated numbers. The first general type of call rule comprises activating a call modification protocol if the number of the remote caller is one of the designated numbers. In some embodiments of the method this type of call rule will be applied if the list is a blacklist. The other comprises activating a call modification protocol if the number of the remote caller is not one of the designated numbers. In some embodiments of the method this type of call rule will be applied if the list is a white list. Of course, the "rule" is executed by a computing device generally without human intervention. Some versions of the method may require or allow human intervention before the computing device activates the call modification. For example, in some embodiments of the method the computing device prompts the user of the local telephone to approve activation of the call modification, and will not activate the call modification unless the user responds. In another example, the computing device prompts the user of the local telephone to circumvent the activation of the call modification, and will activate the call modification unless the user responds.

One embodiment of the method is useful for maintaining the user's privacy from voice identification systems by altering the pitch of the user's voice under some circumstances. The alteration is performed by modulating the signal created by the user's voice, and should not be construed to involve the user merely attempting to speak in a different voice. In this embodiment of the method, the call modification protocol comprises altering the pitch of the audio content of the call that originates from the local telephone. In certain further embodiments of this version of the method the pitch of the user's voice may be raised or lowered to a point within the normal range of human speech. For example, the user's voice may be raised or lowered to a point within about 75-300 Hz, which generally in the range of human speech. In a more specific embodiment the pitch of the user's voice may be raised or lowered to a point within the normal range of male human speech. For example, the user's voice may be raised or lowered to a point within about 75-150 Hz, which generally in the range of male human speech. In an alternate embodiment of the method, the pitch of the user's voice may be raised or lowered to a point within the normal range of female human speech. For example, the user's voice may be raised or lowered to a point within about 150-300 Hz, which generally in the range of female human speech. However, the method may comprise raising or lowering the pitch of the user's voice to outside of the range of normal human speech. This could be useful if the user wants the remote caller to be aware that a voice modification system is in use, or if the user wishes to emulate an automated voice.

In a related embodiment of the method, the call modification protocol comprises altering the pitch of the voice from the remote telephone. The pitch may be modified in any way that would be suitable in the embodiment of the method described in the previous paragraph. This embodiment of the method has the advantage of protecting the remote party from being identified by his or her voice should eavesdropping occur on the call.

An embodiment of the method is provided for activating recording of a phone conversation based on the number of the remote telephone. In this embodiment of the method the call modification protocol involves recording the audio portion of the telephone conversation on non-transient machine-readable media. The record may be saved locally, for example in the local telephone's memory (this is particularly apt if the local phone is a smart phone). Alternatively, it may be stored remotely, for example on a cloud server or on the user's personal computer. Some versions of this method may comprise only recording the audio portion originating from the remote telephone, so that the audio from the local phone is not recorded. Alternatively, the method may comprise only recording the audio portion originating from the local telephone, so that the audio from the remote phone is not recorded. In addition, an audible indication that the call is being recorded could be played, such as the traditional "beep."

Another embodiment of the method involves sending spoofed caller ID information only if the user dials certain numbers. In such embodiments the call modification protocol comprises transmitting caller ID information to the remote telephone that is not the local telephone's number ("spoofed" information). In a more specific embodiment of the method the stored list contains caller-specific caller ID information corresponding to each of the plurality of designated numbers; the method comprising transmitting the caller ID information corresponding to the number of the remote telephone to the remote telephone. In this embodiment the spoofed number may be specific to the number called. In example, a call from the user's mobile phone to a number associated with a customer of the user may show the user's work phone number to allow the customer to recognize the call. A call from the same mobile phone to a number associated with a relative of the user may not be spoofed, or it may show the number of the user's home phone. This is an example in which the stored list is neither a white list nor a blacklist, but allows specific modification of calls based on the identity of the remote telephone.

Another version of the method allows calls to be routed straight to voicemail or routed to the telephone based on the number of the remote telephone. In this version the call modification protocol comprises routing the call directly to a voicemail box. It can be used in two separate ways. For incoming calls, calls can be routed to voicemail based on the number of the remote telephone, or calls can be routed to a specific voicemail box based on the number of the remote telephone. For outgoing calls, the call can be routed directly to the recipient's voicemail box based on the number of the remote telephone. Some embodiments of this version of the method, in which the call is initiated by the remote telephone (incoming call), and in which the stored list contains a voicemail box identifier corresponding to each of the plurality of designated numbers; the method may comprise routing the call to a voicemail box associated with the local telephone that corresponds to the voicemail box identifier. The user may maintain multiple voicemail boxes for different purposes (business, personal, urgent, etc.). The method may be used simply to segregate voicemails based on their context (as inferred from the sender). It may also be used to route calls to voicemail that do not warrant an immediate answer. Other embodiments of this version in which the call is initiated by the local telephone, and in which the stored list contains a voicemail box identifier corresponding to each of the plurality of designated numbers; the method may comprise routing the call to a voicemail box associated with the remote telephone that corresponds to the voicemail box identifier.

In another version of the method, a background sound is played during the call. This can be useful in some cases to prevent the party on the remote phone from learning of the user's location based on ambient sounds. In this version the call rule comprises playing a background sound during the call. The background sound may be played from a sound recording in any machine-readable format. The sounds may be household sounds, traffic sounds, workplace sounds, obscuring sounds, or distracting sounds, to name a few examples. In some embodiments of the method a specific sound may be associated with the remote phone number. Such embodiments of the method, in which the stored list contains a recording identifier corresponding to each of the plurality of designated numbers; the method may comprise playing a background sound recording that corresponds to the recording identifier.

The call rule may also comprise forwarding the call to a call destination. The call destination may be the number of another phone, or it may be a voicemail box. In embodiments of the method in which the stored list contains a destination identifier corresponding to each of the plurality of designated numbers; the method may comprise forwarding the call to a destination that corresponds to the destination identifier. In such embodiments calls will be forwarded to different destinations based on the caller's number. This could be useful to selectively forward important calls to another line, or to selectively forward low-priority calls to a voicemail box.

Another version of the call modification protocol comprises playing a recorded greeting. The greeting may be played prior to prompting the user of the remote telephone to leave a message, but it need not be associated with a voicemail system. Some embodiments of this version of the method, in which the stored list contains a greeting identifier corresponding to each of the plurality of designated numbers, may comprise playing a greeting that corresponds to the greeting identifier. In that way specific greetings may be provided to specific callers. Further embodiments of this version of the method may comprise playing a private recording if the caller is authenticated, for example if the caller transmits a personal identification number during the greeting. Other methods of personal authentication may be used as known in the art.

Any of the above methods may be further modified according to additional rules.

For example, in some embodiments of the above methods the call rule will be applied only if the call is initiated by the remote telephone. In another example, the call rule will be applied only if the call is initiated by the local telephone. In any of the above methods, the portion of the number of the remote telephone may be selected from the group consisting of: the entire number, the area code of the number, the exchange of the number, the country prefix of the number, and the last four digits of the number. In some embodiments of the above methods the plurality of designated numbers comprises a number selected from the group consisting of: an entire number, an area code, an exchange, a country prefix, and four final digits. Any of the above methods may be performed by the local telephone, which comprises a computing device configured or programmed to apply the call rule. Alternatively, in any of the above methods the call may be connected via a call switching system that is configured or programmed to apply the call rule. In any of the above methods the call may be established by a voice over internet protocol. In any of the above methods the call rule may comprises executing the call modification protocol if the number of the remote telephone cannot be identified. Furthermore, in some versions of the above methods the local telephone may have a plurality of numbers at least one of which is a "trigger number," and the call modification protocol may be executed only if the remote telephone initiates the call to a trigger number.

C. Devices

The disclosure provides certain devices for use in conjunction with the methods disclosed above. One embodiment of the device is a computing device configured or programmed to perform any one of the above methods. Another embodiment of the device is a telephone comprising a computing device configured or programmed to perform any one of the above methods. The telephone may be, for example, a smart phone. The method may be performed by running a program on the smart phone, such as an easily downloaded application or "app" for the phone. Another embodiment of the device is a memory storage device comprising a stored program containing a set of instructions which when read by a general purpose computing device causes the device to perform any of the above methods.

D. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the methods, machines, manufactures, compositions of matter, and other teachings of the present disclosure. Additionally, the disclosure shows and describes only certain embodiments of the methods, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the methods, machines, manufactures, compositions of matter, and other teachings of the present disclosure and to enable others skilled in the art to utilize the teachings of the present disclosure in such, or other, embodiments and with the various modifications required by the particular applications or uses. Accordingly, the methods, machines, manufactures, compositions of matter, and other teachings of the present disclosure are not intended to limit the exact embodiments and examples disclosed herein. Any section headings herein are provided only for consistency with the suggestions of 37 C.F.R. §1.77 or otherwise to provide organizational queues. These headings shall not limit or characterize the invention(s) set forth herein.

We claim:

1. A method of modifying a telephone call between a local telephone and a remote telephone based on the number of the remote telephone, the method comprising
   (a) identifying the number of the remote telephone;
   (b) comparing a portion of the number of the remote telephone to a stored list comprising a plurality of designated numbers; and
   (c) applying a call rule selected from one of the following:
      (i) activating a call modification protocol if the portion of the number of the remote caller is one of the designated numbers; or
      (ii) activating a call modification protocol if the portion of the number of the remote caller is not one of the designated numbers,
   wherein the call modification protocol comprises altering the pitch of the audio content of the call that originates from the local telephone.

2. The method of claim 1, wherein the call modification protocol comprises altering the pitch of the audio content of the call that originates from the local telephone to a range of about 75-300 Hz.

3. The method of claim 1, wherein the call modification protocol comprises altering the pitch of the audio content of the call that originates from the local telephone to a range of about 75-150 Hz to simulate a human male voice.

4. The method of claim 1, wherein the call modification protocol comprises altering the pitch of the audio content of the call that originates from the local telephone to a range of about 150-300 Hz to simulate a human female voice.

5. The method of claim 1, wherein the call modification protocol comprises altering the pitch of the audio content of the call that originates from the local telephone to a frequency outside of the normal human range of about 75-300 Hz to simulate artificial speech.

6. A method of modifying a telephone call between a local telephone and a remote telephone based on the number of the remote telephone, the method comprising
   (a) identifying the number of the remote telephone;
   (b) comparing a portion of the number of the remote telephone to a stored list comprising a plurality of designated numbers; and
   (c) applying a call rule selected from one of the following:
      (i) activating a call modification protocol if the portion of the number of the remote caller is one of the designated numbers; or
      (ii) activating a call modification protocol if the portion of the number of the remote caller is not one of the designated numbers, wherein the call modification protocol comprises recording the audio portion of the telephone conversation on non-transient machine-readable media.

7. The method of claim 6 comprising saving the recording on a data storage device in the local telephone.

8. The method of claim 6 comprising saving the recording on a data storage device that is remote from the local telephone.

9. The method of claim 6 comprising recording only the audio portion of the call that originates from the remote telephone.

10. The method of claim 6 comprising recording only the audio portion of the call that originates from the local telephone.

11. The method of claim 6 comprising playing an audible indicator that recording is occurring on the call.

12. The method of claim 6 comprising transmitting caller ID information to the remote telephone that is not the local phone's number.

13. A method of modifying a telephone call between a local telephone and a remote telephone based on the number of the remote telephone, the method comprising
   (a) identifying the number of the remote telephone;
   (b) comparing a portion of the number of the remote telephone to a stored list comprising a plurality of designated numbers, in which the portion of the number of the remote telephone is selected from the group consisting of: the area code of the number, the exchange of the number, the country prefix of the number, and the last four digits of the number; and
   (c) applying a call rule selected from one of the following:
      (i) activating a call modification protocol if the portion of the number of the remote caller is one of the designated numbers; or
      (ii) activating a call modification protocol if the portion of the number of the remote caller is not one of the designated numbers,
wherein the call modification protocol comprises transmitting caller ID information to the remote telephone that is not the local telephone's number if the portion of the number of the remote caller is found in one of the designated numbers.

14. The method of claim 13, wherein the stored list contains a caller-specific caller ID information corresponding to each of the plurality of designated numbers; the method comprising transmitting the caller ID information corresponding to the number of the remote telephone.

15. A method of modifying a telephone call between a local telephone and a remote telephone based on the number of the remote telephone, the method comprising
   (a) identifying the number of the remote telephone;
   (b) comparing a portion of the number of the remote telephone to a stored list comprising a plurality of designated numbers; and
   (c) applying a call rule selected from one of the following only if the call is initiated by the local telephone:
      (i) activating a call modification protocol if the portion of the number of the remote caller is one of the designated numbers; or
      (ii) activating a call modification protocol if the portion of the number of the remote caller is not one of the designated numbers
wherein the call modification protocol comprises routing the call directly to a voicemail box.

16. The method of claim 15, wherein the call is initiated by the local telephone, wherein the stored list contains a voicemail box identifier corresponding to each of the plurality of designated numbers; the method comprising routing the call to a voicemail box associated with the remote telephone that corresponds to the voicemail box identifier.

17. A method of modifying a telephone call between a local telephone and a remote telephone based on the number of the remote telephone, the method comprising:
   (a) identifying the number of the remote telephone;
   (b) comparing a portion of the number of the remote telephone to a stored list comprising a plurality of designated numbers; and
   (c) applying a call rule selected from one of the following:
      (i) activating a call modification protocol if the portion of the number of the remote caller is one of the designated numbers; or
      (ii) activating a call modification protocol if the portion of the number of the remote caller is not one of the designated numbers
wherein the call modification protocol comprises playing a background sound recording during the call.

18. The method of claim 17, wherein the stored list contains a recording identifier corresponding to each of the plurality of designated numbers; the method comprising playing a background sound recording that corresponds to the recording identifier.

19. The method of claim 17 comprising transmitting caller ID information to the remote telephone that is not the local phone's number.

20. A method of modifying a telephone call between a local telephone and a remote telephone based on the number of the remote telephone, the method comprising
   (a) identifying the number of the remote telephone;
   (b) comparing a portion of the number of the remote telephone to a stored list comprising a plurality of designated numbers; and
   (c) applying a call rule selected from one of the following only if the call is initiated by the local telephone:
      (i) activating a call modification protocol if the portion of the number of the remote caller is one of the designated numbers; or
      (ii) activating a call modification protocol if the portion of the number of the remote caller is not one of the designated numbers wherein the call modification protocol comprises forwarding the call to a call destination.

21. The method of claim 20 wherein the call destination is a voicemail box.

22. The method of claim 20 wherein the call destination is a destination telephone.

23. The method of claim 20 wherein the stored list contains a destination identifier corresponding to each of the plurality of designated numbers; the method comprising forwarding the call to a destination that corresponds to the destination identifier.

24. A method of modifying a telephone call between a local telephone and a remote telephone based on the number of the remote telephone, the method comprising
   (a) identifying the number of the remote telephone;
   (b) comparing a portion of the number of the remote telephone to a stored list comprising a plurality of designated numbers; and
   (c) applying a call rule selected from one of the following:
       (i) activating a call modification protocol if the portion of the number of the remote caller is one of the designated numbers; or
       (ii) activating a call modification protocol if the portion of the number of the remote caller is not one of the designated numbers
wherein the call modification protocol comprises playing a recorded greeting.

25. The method of claim 24, wherein the stored list contains a greeting identifier corresponding to each of the plurality of designated numbers; the method comprising playing a greeting that corresponds to the greeting identifier.

26. The method of claim 24, comprising playing a private recording if the caller transmits a personal identification number during the greeting.

27. The method of claim 24, comprising prompting the caller to leave a voicemail message after the greeting.

\* \* \* \* \*